Feb. 18, 1930.  H. WEICHSEL  1,747,198
SYNCHRONOUS ALTERNATING CURRENT MOTOR
Filed Dec. 24, 1923
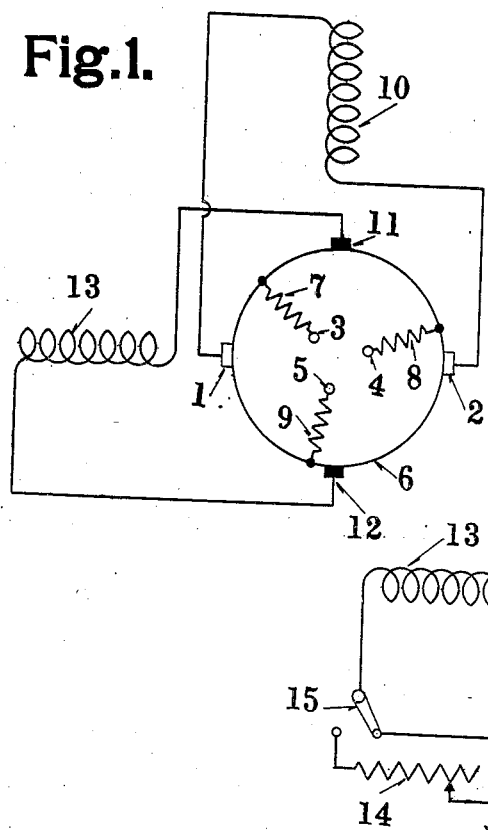
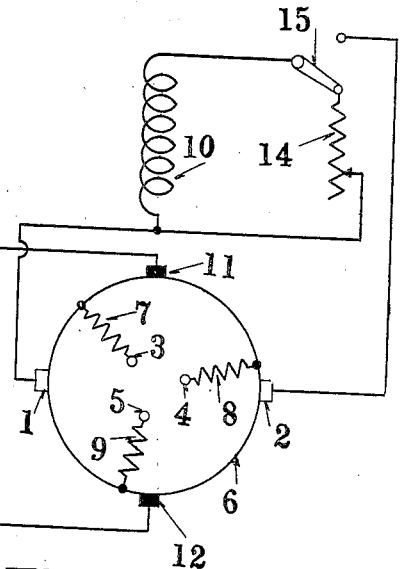
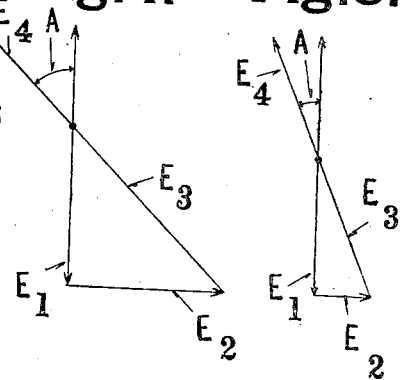
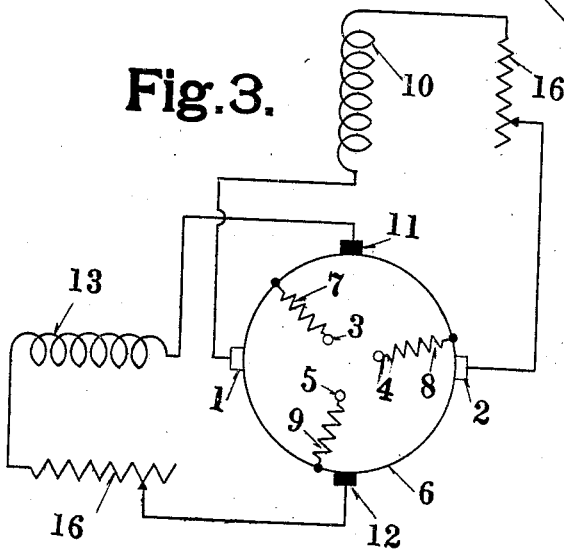
INVENTOR
Hans Weichsel
BY E. E. Huffman
ATTORNEY Patented Feb. 18, 1930

1,747,198

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

SYNCHRONOUS ALTERNATING-CURRENT MOTOR

Application filed December 24, 1923. Serial No. 682,367.

My invention relates to a synchronous alternating current motor and particularly to that type having no defined polar projections. It is among the objects of the invention to improve the weight efficiency and to enable such motors to operate with satisfactory power factor. Speaking generally I accomplish these objects by providing the motor with means whereby a unidirectional neutralizing flux will be produced which will either prevent the development of an alternating current rotor reaction flux displaced from the axis of the direct current exciting winding, or limit such flux to a small value. The invention is applicable to both single and polyphase motors.

In the accompanying drawings Figure 1 diagrammatically illustrates an embodiment of my invention in a polyphase motor; Figures 2 and 3 illustrate said machine with suitable starting means; and Figures 4 and 5 are explanatory vector diagrams.

Referring to Figure 1 the rotor carries a commuted winding 6 and polyphase winding 7, 8 and 9 supplied with alternating current through slip rings 3, 4 and 5. The commuted winding and the polyphase winding are preferably interconnected as shown. A pair of brushes 1, 2 cooperates with the commutator and are in circuit with the direct current exciting winding 10. The commutator also carries brushes 11, 12 displaced from the brushes 1, 2 and in circuit with a neutralizing winding 13 on the stator. The preferable arrangement of brushes and windings is as shown in Figure 1 wherein the exciting brushes 1, 2 are at an angle of 90 degrees to the exciting winding 10, the neutralizing winding 13 in the axis of the brushes 1, 2, and the brushes 11, 12 in the axis of the exciting winding 10, and therefore 90 degrees displaced from the brushes 1, 2.

Referring to the operation of the machine, alternating current is supplied to the slip rings, and at synchronous speed a direct current E. M. F. appears at the brushes 1, 2 and is impressed upon the exciting winding 10 thereby producing a direct current exciting flux in the axis of the winding 10. At synchronous speed the rotor flux produced by the polyphase current supplied to the rotor is stationary in space for a given load and, under conditions hereinafter referred to, is located in the axis of the brushes 1, 2. Due to the rotation of the armature conductors in the direct current exciting field, there appears on the slip rings a polyphase E. M. F. $E_1$ (see Figures 4 and 5). In addition to the voltage $E_1$ there also appears at the slip rings a voltage $E_2$ which results from the rotation of the armature conductors in the stationary alternating current field above referred to, which is at an angle to the direct current exciting field and is 90 degrees displaced from this field when the line current is in phase with $E_1$. This voltage $E_2$ is 90 degrees phase displaced from the voltage $E_1$ as indicated in Figures 4 and 5 when the line current is in phase with $E_1$. Therefore under the assumption made the resultant slip ring voltage produced by rotation of the armature conductors is the voltage $E_3$ as shown in Figures 4 and 5, and the impressed line voltage necessary to counterbalance this resultant voltage is the equal and opposed voltage $E_4$. The phase angle between the impressed voltage and the line current, if the winding 13 were omitted, would be the angle "A" in Figure 4. If the winding 13 in the axis of the brushes 1, 2 be excited with direct current in such direction as to produce a magnetization opposing the magnetization produced by the rotor currents, then the rotor reaction field can be eliminated or prevented from developing to the extent to which it would otherwise develop, with the result that that component of the slip ring voltage which is caused by the rotation of the armature conductors in the rotor reaction field—that is to say, the voltage $E_2$ will be decreased in magnitude and the voltage relations shown in Figure 5, for example, may be produced. As indicated in this figure the line current and the impressed voltage are much more nearly in phase than in Figure 4, with the result that the impressed voltage for a given output of the machine, and the power factor of the machine, is greatly improved. It will usually be preferable to so adjust the neutralizing flux as to substantially neutralize the rotor reaction flux and thus produce substantially unity power factor.

As indicated in Figure 1, the direct current voltage to be applied to the winding 13 is obtained from the brushes 11, 12. The voltage appearing across these brushes varies with field which is the resultant of the rotor reaction flux and the flux produced by the winding 13, and since, when the load increases the rotor reaction flux tends to increase, the voltage at the brushes 11, 12 will tend to increase, thus increasing the neutralizing effect of the winding 13 and thus limiting the magnitude of the resultant flux. It results, therefore, that the degree of neutralization of the armature reaction flux is substantially proportional to the load current.

Any suitable means for starting induction motors may be used to start my improved motor. As shown in Figure 2 adjustable resistances 14 may be provided and so connected with the stator windings as to short-circuit these windings over the resistances by means of the switches 15. When the machine is up to speed the switches are moved to cut out the resistances and connect the windings with the brushes. Another starting arrangement is shown in Figure 3 in which the windings are left connected with the rotor at starting but through adjustable resistances 16, which are cut out when synchronous speed has been obtained.

In applying my invention to a single phase motor it will be understood that the winding 13 neutralizes the unidirectional component of the armature reaction flux. It will also be understood that while in the machine herein described the inducing member rotates and the induced member is stationary, it is possible to have the inducing member stationary and the induced member rotating, in which case the commutator would be stationary and the brushes would rotate.

Having fully described my invention, what I claim as new and desire to secure by Letters Patent of the United States is:

1. In a synchronous alternating current motor, the combination of an inducing member provided with a commutator and with exciting brushes and slip rings, an induced member provided with an exciting winding in circuit with the exciting brushes and with a second winding axially displaced from the exciting winding, and means for supplying to said second winding a direct current E. M. F. proportional to the alternating current rotor reaction flux, said winding being adapted to produce neutralizing ampere turns substantially equal to and opposing the total alternating current armature ampere turns which tend to produce a reaction flux unidirectional with respect to the induced member.

2. In a synchronous alternating current motor, the combination of an inducing member provided with a commutator and with exciting brushes and slip rings, an induced member provided with an exciting winding in circuit with the exciting brushes and with a second winding axially displaced from the exciting winding, and means independent of the exciting brushes for supplying a direct current E. M. F. to said second winding, said winding being adapted to produce neutralizing ampere turns substantially equal to and opposing the total alternating current armature ampere turns which tend to produce a reaction flux unidirectional with respect to the induced member.

3. In a synchronous alternating current motor, the combination of an inducing member provided with a commutator and with exciting brushes and slip rings, an induced member provided with an exciting winding in circuit with the exciting brushes and displaced from the axis of said brushes, a second winding on the stator, and a second set of brushes on the commutator and in circuit with the second stator winding, said second winding being adapted to produce neutralizing ampere turns substantially equal to and opposing the total alternating current armature ampere turns which tend to produce a reaction flux unidirectional with respect to the induced member.

4. In a synchronous alternating current motor, the combination of an inducing member provided with a commutator and with exciting brushes and slip rings, an induced member provided with an exciting winding in circuit with the exciting brushes and displaced 90 electrical degrees from the axis of said brushes, a second winding on the stator in the axis of the exciting brushes, and a second set of brushes on the commutator in the axis of the exciting winding and in circuit with the second stator winding, said second winding being adapted to produce neutralizing ampere turns substantially equal to and opposing the total alternating current armature ampere turns which tend to produce a reaction flux unidirectional with respect to the induced member.

5. The method of operating a motor which carries variable load at synchronous speed, comprising, producing a primary flux which revolves with respect to the primary, causing the primary flux to generate induction-motor-torque producing ampere turns in the secondary, producing auxiliary voltages of slip frequency and of an amplitude independent of their frequency, which differ in phase below synchronism and become unidirectional at synchronism, impressing the auxiliary voltages on displaced secondary circuits, adjusting the phase of one auxiliary voltage to lead the voltage generated by the primary flux near synchronism in the secondary circuit on which said auxiliary voltage is impressed, and adjusting the phase of the other auxiliary voltage to lag behind the voltage generated near synchronism in the secondary circuit on which this other auxiliary voltage is impressed.

6. The method of operating a motor which carries variable load at synchronous speed, comprising, producing a primary magnetization, impressing a unidirectional voltage on each of a plurality of displaced circuits on the secondary to produce a secondary magnetization and causing the magnitude of each of the unidirectional voltages to so vary with varying motor load as to displace the resultant secondary magnetization in a direction opposite to that in which the resultant motor magnetization moves whenever the synchronous load is increased.

7. The method of operating a motor which carries variable load at synchronous speed, comprising, impressing a unidirectional voltage on each of a plurality of displaced circuits on the secondary to produce a secondary magnetization and causing the magnitude of one unidirectional voltage to vary with varying load in one way and the magnitude of another unidirectional voltage to vary with varying load in another way to cause the resultant secondary magnetization to increase with increasing motor load.

8. A motor which carries a variable load at synchronous speed, having a primary member carrying a winding, a secondary member having displaced windings in inductive relation to the primary, means adapted to make available at synchronism a plurality of unidirectional voltages the magnitude of which varies with changing load, and means adapted to cause the resultant secondary magnetization to be displaced in a direction opposite to that in which the resultant motor magnetization moves whenever the load increases, said means including the displaced windings on the secondary for producing secondary magnetizations dependent on said varying unidirectional voltages.

9. A motor which carries variable load at synchronous speed, having a primary carrying a winding adapted to produce a primary flux which revolves with respect to the primary, a secondary having displaced windings in each of which a voltage is generated by the primary flux, means for impressing on each of at least two of said secondary windings an auxiliary voltage of slip frequency which becomes unidirectional at synchronism, and means for adjusting the phase of an auxiliary voltage with respect to the voltage generated near synchronism in the winding on which said voltage is impressed, adapted to cause one auxiliary voltage to lead and another auxiliary voltage to lag behind the corresponding generated voltage.

10. A motor which carries variable load at synchronous speed, having a primary member carrying a winding, a secondary member having displaced windings in inductive relation to said primary winding, means adapted to make available at synchronism a plurality of unidirectional voltages, means for causing the magnitude of one of these voltages to vary in one way with varying motor load and for causing the magnitude of another to vary in another way, and means including the displaced windings on the secondary for producing secondary magnetizations dependent on said unidirectional voltages, adapted to produce a resultant unidirectional magnetization which increases with increasing motor load.

11. A motor which carries variable load at synchronous speed, having a primary member carrying a winding adapted to produce a primary flux which revolves with respect to the primary, a secondary member having displaced windings in inductive relation to the primary flux, means adapted to make available phase displaced voltages which are of slip frequency near synchronism and unidirectional at synchronism, and means for impressing said voltages on said secondary windings with the phase of the voltage impressed on one of said secondary windings leading that of the voltage generated therein by the primary flux and with the phase of the voltage impressed on the other of said secondary windings lagging behind that of the voltage generated therein by the primary flux.

12. A motor which carries variable load at synchronous speed, comprising, a primary member adapted for connection to an alternating current supply, brushes disposed along a plurality of axes per pole pair cooperating with the primary to make available slip frequency voltages at sub-synchronous and unidirectional voltages at synchronous speed, a secondary member having a polyphase arrangement of windings, brushes along two axes per pole pair being in circuit with two of the windings on the secondary and so positioned and connected as to impress on one of these windings at speeds differing from the synchronous a voltage leading that concurrently generated in said winding and on the other winding a voltage lagging behind that concurrently generated therein.

13. The method of operating a motor which carries variable load at synchronous speed, comprising, producing auxiliary voltages which are unidirectional at synchronism and which vary in magnitude when the motor load varies, impressing these auxiliary voltages on the secondary to produce displaced ampere turns, and causing the magnitude of the resultant secondary ampere turns to vary when the motor load varies.

14. The method of operating a motor which carries variable load at synchronous speed, comprising, producing auxiliary voltages which are unidirectional at synchronism and which vary in magnitude when the motor load varies, impressing these auxiliary voltages on the secondary to produce displaced ampere turns, and causing the magnitude of the resultant secondary ampere turns to increase when the motor load increases.

15. An alternating current motor comprising relatively movable primary and secondary windings, and an adjusting winding immovably related to one of said windings and connected with the other of said windings in reverse phase sequence.

16. In an alternating current motor which carries variable load at synchronous speed, a primary and a secondary without defined polar projections, said primary being adapted to be connected to a source of phase displaced voltages, brushes cooperating with the primary and disposed along a plurality of axes per pole pair to make available unidirectional voltages at synchronous speed, a polyphase arrangement of windings on the secondary, brushes along two axes per pole pair being in circuit with two of the windings on the secondary and the ratio of the ampere turns produced in said windings differing from the ratio of the brush voltages responsible for said ampere turns.

17. A motor which carries veriable load at synchronous speed, comprising, a primary member having a winding, a secondary member having displaced windings in inductive relation to said primary winding, brushes cooperating with said primary member to make available auxiliary voltages which are unidirectional at synchronism, and means including said brushes for impressing the auxiliary voltages on said secondary windings, the maximum number of ampere turns produced by one auxiliary voltage in one of the secondary windings differing from the maximum number of ampere turns produced by another auxiliary voltage in another secondary winding.

In testimony whereof, I have hereunto set my hand this the 20th day of December, 1923.

HANS WEICHSEL.